(12) United States Patent
Marek

(10) Patent No.: US 8,943,702 B2
(45) Date of Patent: Feb. 3, 2015

(54) GUARD FOR SENSOR APPARATUS IN TILTING ARRANGEMENT

(75) Inventor: John P. Marek, Sugar Grove, IL (US)

(73) Assignee: Caterpillar Inc., Peoria, IL (US)

( * ) Notice: Subject to any disclaimer, the term of this patent is extended or adjusted under 35 U.S.C. 154(b) by 346 days.

(21) Appl. No.: 13/459,303

(22) Filed: Apr. 30, 2012

(65) Prior Publication Data

US 2013/0283648 A1  Oct. 31, 2013

(51) Int. Cl.
*G01B 7/30* (2006.01)
*G01B 5/24* (2006.01)

(52) U.S. Cl.
USPC ............................. 33/366.11; 33/1 PT; 33/1 N

(58) Field of Classification Search
USPC .................. 33/366.11, 1 N, 1 PT; 37/348
See application file for complete search history.

(56) References Cited

U.S. PATENT DOCUMENTS

| | | | |
|---|---|---|---|
| 5,657,544 A | 8/1997 | Ota | |
| 5,713,144 A * | 2/1998 | Haraoka | 37/348 |
| 6,068,340 A * | 5/2000 | Yano et al. | 297/478 |
| 6,114,820 A * | 9/2000 | Nishigaya | 318/466 |
| 6,688,006 B2 * | 2/2004 | Itomi | 33/1 N |
| 7,308,765 B2 * | 12/2007 | Riepertinger | 33/1 N |
| 7,446,305 B2 * | 11/2008 | Riepertinger | 250/231.13 |
| 8,112,896 B2 * | 2/2012 | Ferrari et al. | 33/503 |
| 8,726,529 B2 * | 5/2014 | Brosz et al. | 33/1 N |
| 2009/0133271 A1 * | 5/2009 | Sano | 33/1 PT |

\* cited by examiner

*Primary Examiner* — Christopher Fulton

(74) *Attorney, Agent, or Firm* — Miller, Matthias & Hull; Michael D. Braunstein

(57) ABSTRACT

A guard for a sensor apparatus in a tilting arrangement. The guard includes a first tubular portion supported on the tilting arrangement, a longitudinal portion extending from the first tubular portion, and a second tubular portion extending from the longitudinal portion. The first tubular portion provides a first cavity adapted to partially enclose a first mounting stud of the sensor apparatus. Similarly, the second tubular portion provides a second cavity adapted to partially enclose a second mounting stud of the sensor apparatus. And, the longitudinal portion provides a recess adapted to partially enclose a lever member of the sensor apparatus.

8 Claims, 4 Drawing Sheets

GUARD FOR SENSOR APPARATUS IN TILTING ARRANGEMENT

TECHNICAL FIELD

The present disclosure relates to a sensor assembly for a tilting arrangement, and more particularly to a guard for a sensor apparatus in the sensor assembly.

BACKGROUND

Machines, such as earth-moving machines, include a tilting arrangement to move and/or tilt an implement in order to perform a task. A sensor apparatus is provided with the tilting arrangement to determine a tilt angle or orientation of the implement in the machine. During operation of the machine, there may be a risk of debris falling into the sensor apparatus and damage the sensor apparatus. Further, the falling debris may clog the sensor apparatus and hinder the operation of the sensor apparatus.

Typically, a guard is provided for the sensor apparatus in the machine. The guard covers the sensor apparatus and protects the sensor apparatus against the falling debris in the machine. Conventional guards are generally shaped like a fender or an enclosure, covering the sensor apparatus with a region defined by the range of motion of the sensor apparatus.

U.S. Pat. No. 5,657,544 discloses a rotational angle detecting device having a rotary shaft rotatably received inside a housing. The rotational angle detecting device includes a rotational angle detecting means for detecting an angle of rotation of the rotary shaft relative to the housing. The rotational angle detecting means are interposed between one end face of the rotary shaft disposed inside the housing and a portion of a wall of the housing confronting the end face of the rotary shaft.

SUMMARY

In an aspect, the present disclosure provides a guard for a sensor apparatus in a tilting arrangement. The guard includes a first tubular portion supported on the tilting arrangement. The first tubular portion provides a first cavity adapted to partially enclose a first mounting stud of the sensor apparatus. The guard further includes a longitudinal portion extending from the first tubular portion, and providing a recess adapted to partially enclose a lever member of the sensor apparatus. The guard also includes a second tubular portion extending therefrom the longitudinal portion, and providing a second cavity adapted to partially enclose a second mounting stud of the sensor apparatus.

In another aspect, the present disclosure provides a sensor assembly for the tilting arrangement in a machine. The sensor assembly includes the sensor apparatus configured to determine a tilt angle of an implement in the machine. The sensor assembly further includes the guard for the sensor apparatus. The guard includes the first tubular portion supported on the tilting arrangement, the longitudinal portion extending from the first tubular portion, and the second tubular portion extending from the longitudinal portion. The first tubular portion provides the first cavity to partially enclose the first mounting stud of the sensor apparatus. Similarly, the second tubular portion provides the second cavity to partially enclose the second mounting stud of the sensor apparatus. And, the longitudinal portion provides the recess to partially enclose the lever member of the sensor apparatus.

In yet another aspect, the present disclosure provides the machine including the implement to perform an earth-moving operation. The machine includes the tilting arrangement to provide a tilt movement to the implement. The tilting arrangement includes the tilt lever support and the tilt lever pivotally connected to each other. The machine includes the sensor assembly associated with the tilting arrangement having the sensor apparatus and the guard. The sensor apparatus is configured to determine the tilt angle of the implement. The sensor apparatus includes the first mounting stud disposed on the tilt lever of the tilting arrangement, the second mounting stud disposed on the tilt lever support of the tilting arrangement, and the lever member connected between the first mounting stud and the second mounting stud. Further, the guard includes the first tubular portion supported on the tilt lever of the tilting arrangement, the longitudinal portion extending from the first tubular portion, and the second tubular portion extending from the longitudinal portion. The first tubular portion provides the first cavity to partially enclose the first mounting stud, the second tubular portion provides the second cavity adapted to partially enclose the second mounting stud, and the longitudinal portion provides the recess to partially enclose the lever member of the sensor apparatus.

Other features and aspects of this disclosure will be apparent from the following description and the accompanying drawings.

DETAILED DESCRIPTION

Figures 1, 2:
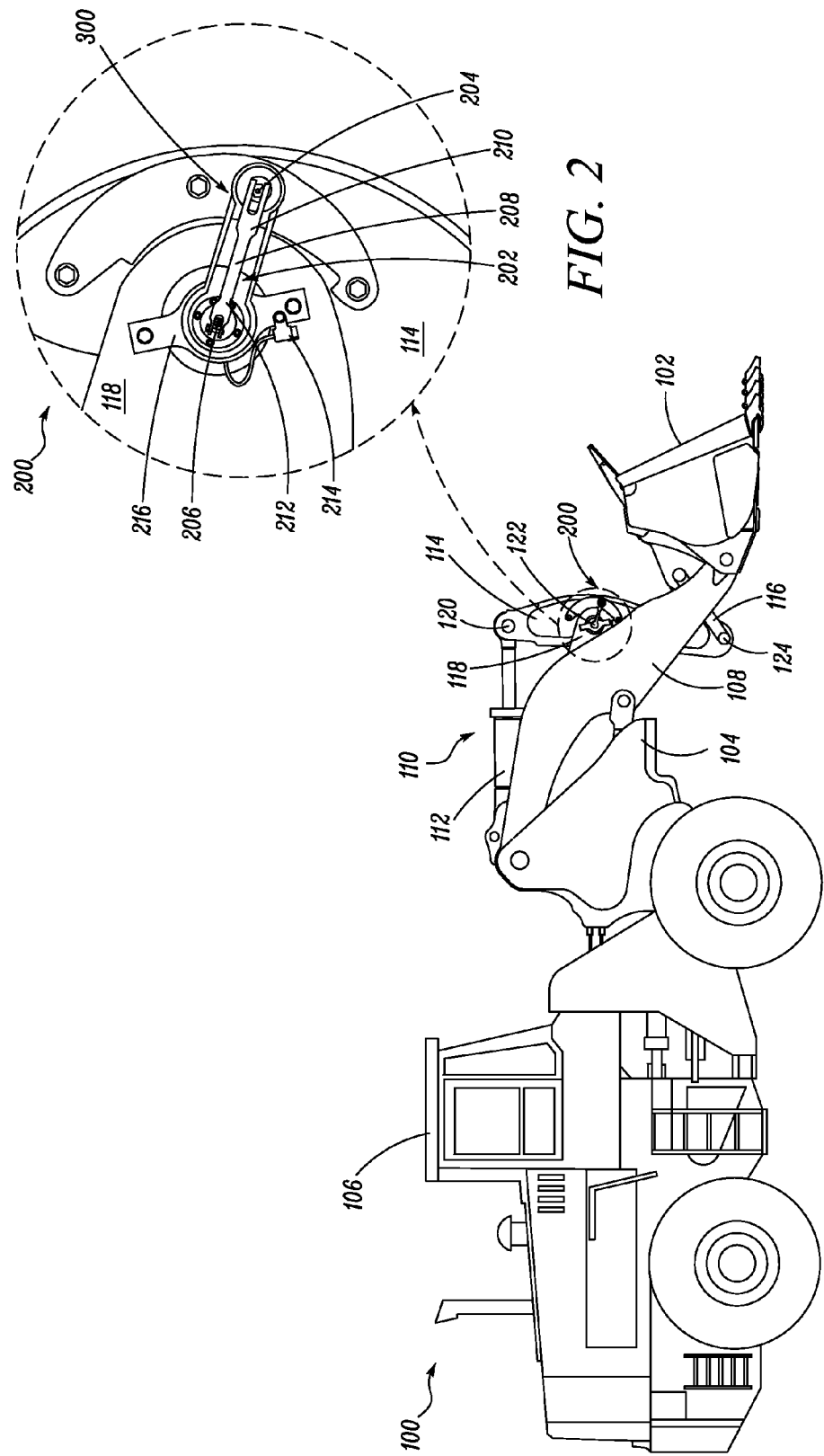
FIG. 1 illustrates a side view of a machine with a tilting arrangement, according to an aspect of the present disclosure.
FIG. 2 illustrates an enlarged view of a portion of the tilting arrangement, showing a sensor assembly, according to an aspect of the present disclosure.

The present disclosure will now be described in detail with reference being made to accompanying figures. A machine 100 in which disclosed embodiments may be implemented is schematically illustrated in FIG. 1. In the accompanied drawings, the machine 100 is illustrated as a wheel loader. However, the machine 100 may be any earth moving machine used in industries like mining or construction, for example, a loader, an excavator, a harvester, a dozer, or the like. The machine 100 may be generically described as any machine having an implement 102. The implement 102 may move and/or tilt in order to perform a task in the machine 100. For the purpose of the present disclosure, the implement 102 is illustrated as a bucket, which may be used to scoop and/or lift the material. However, it may be contemplated that the implement 102 may be any of, for example, a blade, an auger, a fork, a snow plow, etc.

The machine 100 may include a frame 104 for supporting various components of the machine 100. Further, an operator cab 106 may be defined in the form of an enclosure, and supported on the frame 104. The operator cab 106 may include control means to control various functions of the machine 100. The machine 100 may further include a lift arm 108 pivotally mounted on the frame 104. The lift arm 108 may be configured to support and move the implement 102 in the machine 100. The machine 100 may also include a tilting arrangement 110 configured to provide a tilt movement to the implement 102. As illustrated, the tilting arrangement 110 may include a tilt actuator 112, in connection with a tilt lever 114, to move the implement 102. Further, the tilt lever 114 may be connected to the implement 102 directly, or via a linkage member 116.

The tilting arrangement 110 may further include a tilt lever support 118 rigidly attached to the lift arm 108. The tilt lever support 118 may be pivotally connected to the tilt lever 114 in the tilting arrangement 110. In the illustrated embodiment, the tilt lever 114 is connected to the tilt actuator 112 at a first pivot connection 120, to the tilt lever support 118 at a second pivot connection 122, and to the linkage member 116 at a third pivot connection 124. It may be apparent to a person having ordinary skill in the art that, such an arrangement translates a linear movement of the tilt actuator 112 to a tilt movement of the implement 102, via the tilt lever 114.

Further, FIG. 1 illustrates a sensor assembly 200 associated with the tilting arrangement 110. In an embodiment, the sensor assembly 200 may extend between the tilt lever 114 and the tilt lever support 118. FIG. 2 illustrates a detailed view of the sensor assembly 200. The sensor assembly 200 of the present disclosure may include a sensor apparatus 202 and a guard 300 for the sensor apparatus 202. The sensor apparatus 202 may be configured to determine a tilt angle of the implement 102 with respect to the lift arm 108 or the frame 104.

In an embodiment, the sensor apparatus 202 may include a first mounting stud 204, a second mounting stud 206, and a lever member 208. The first mounting stud 204 may be disposed on the tilt lever 114, and the second mounting stud 206 may be disposed on the tilt lever support 118. Further, the lever member 208 may be connected between the first mounting stud 204 and the second mounting stud 206, in the sensor apparatus 202. In particular, the lever member 208 may be pivotally supported on the first mounting stud 204 at a slider fork section 210, and on the second mounting stud 206 at a clamp section 212. According to an embodiment, the lever member 208 may be slidably supported to the first mounting stud 204 at the slider fork section 210, and clamped to the second mounting stud 206 at the clamp section 212. It may be apparent that the lever member 208 is constrained to move in conjunction with the tilt lever 114, which in turn defines the tilt movement of the implement 102 in the machine 100.

Further, the sensor apparatus 202 may include a sensor probe 214 and a rotational angle detecting device (not illustrated). The sensor probe 214, in conjunction with the rotational angle detecting device, may determine the movement of the lever member 208, and therefore a relative position of the tilt lever 114 with respect to the tilt lever support 118, and consequently the tilt angle of the implement 102. The sensor probe 214 may include, for example, a magneto-resistive sensor, an interferometer, an optical encoder, a photo-reflective sensor, or the like. As may be understood by a person having ordinary skill in the art that, the sensor probe 214 may read one or more markings or patterns on the lever member 208, based on the type of sensor probe 214, and generate an electric signal proportional to the movement of the lever member 208. The electric signal may be processed by the rotational angle detecting device to determine the tilt angle of the implement 102.

In an embodiment, the sensor assembly 200 may further include a bracket 216 removably connected to the tilt lever support 118. The bracket 216 may be connected to the tilt lever support 118 by using fastening means, for example, but not limited to, nuts and bolts, screws, etc. The second mounting stud 206, of the sensor apparatus 202, may be disposed on the bracket 216. In an embodiment, the bracket 216 may rotatably support the second mounting stud 206.

Figure 3:
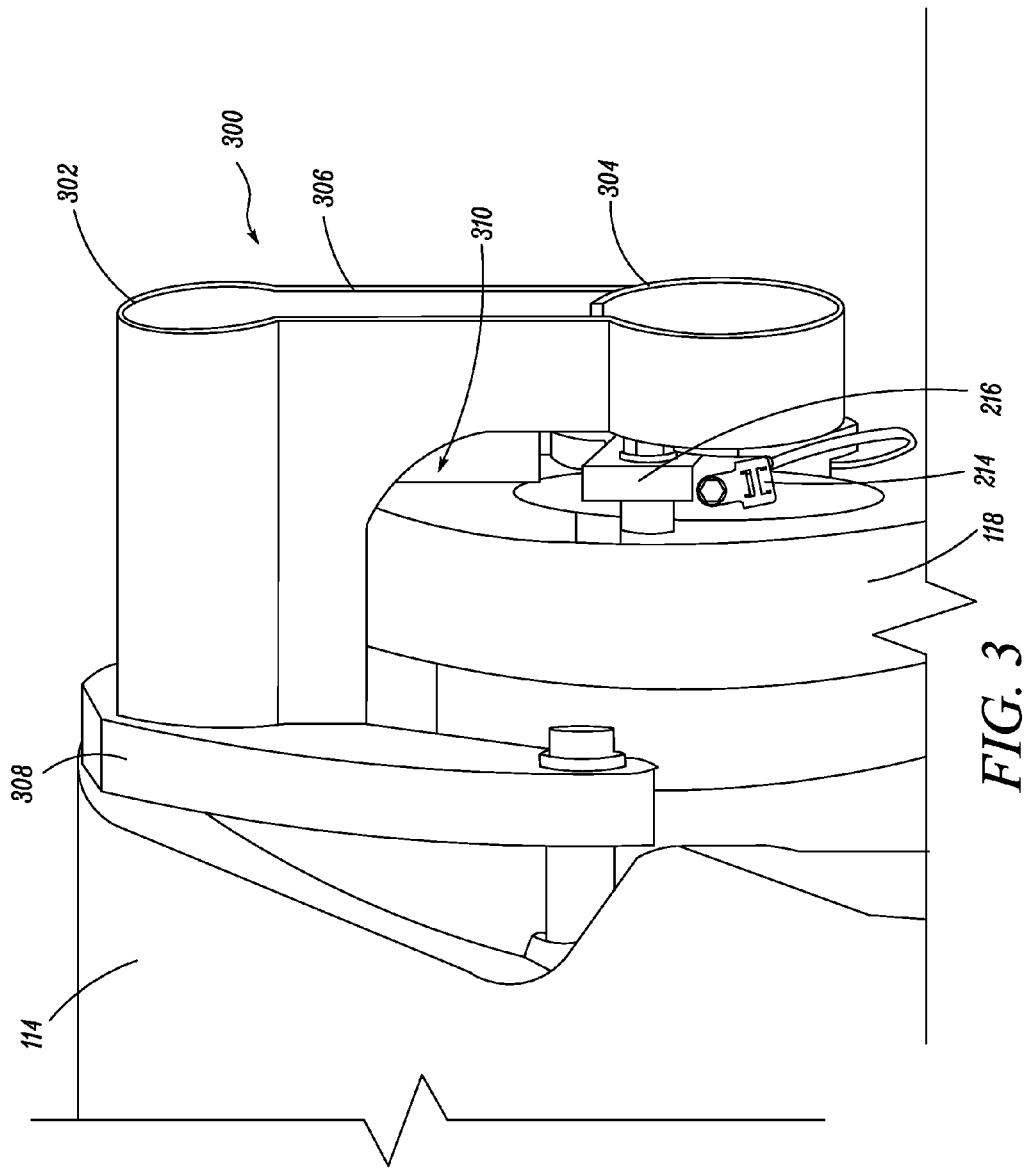
FIG. 3 illustrates a side perspective view of the sensor assembly of FIG. 2, according to an aspect of the present disclosure.
Figure 4:
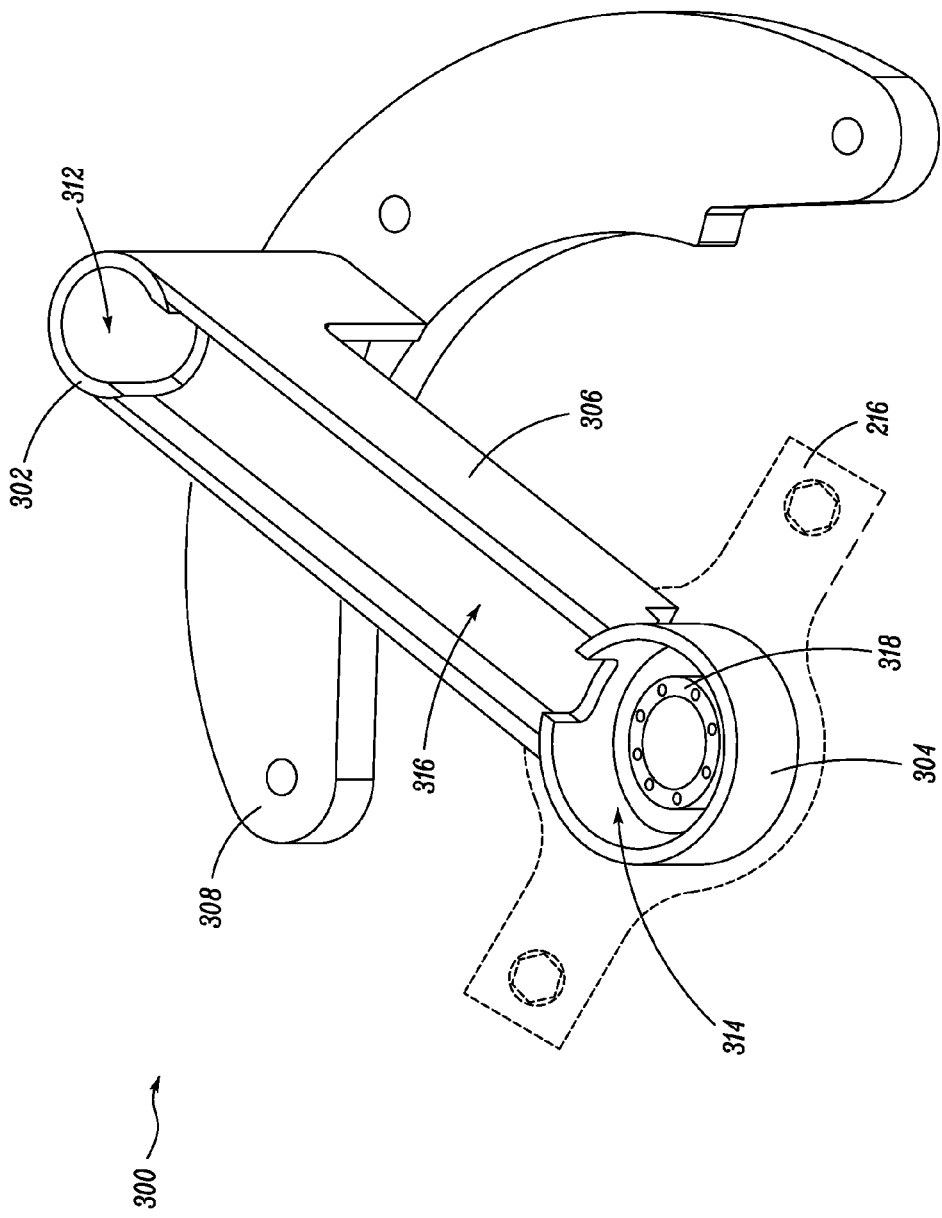
FIG. 4 illustrates a perspective view of a guard of the sensor assembly, according to an aspect of the present disclosure.

FIG. 2 further illustrates the guard 300 partially enclosing the sensor apparatus 202 in the sensor assembly 200. The guard 300 of the present disclosure may conform to the shape of the sensor apparatus 202. FIGS. 3-4 illustrate different perspective views of the guard 300, according to an embodiment of the present disclosure. The guard 300 may be a unibody structure formed by casting, or joining different portions together. As illustrated in FIG. 3, the guard 300 may be supported on the tilt lever 114, and extend along the length of the sensor apparatus 202 in the sensor assembly 200.

In an embodiment, the guard 300 may include a first tubular portion 302, a second tubular portion 304, and a longitudinal portion 306. As illustrated, the longitudinal portion 306 may extend between the first tubular portion 302 and the second tubular portion 304. In an embodiment, the guard 300 may further include an adapter portion 308 removably mounted to the tilt lever 114 using fastening means, for example, nuts and bolts, screws, etc. The adapter portion 308 may provide a cantilevered support for the guard 300 on the tilt lever 114. Such an arrangement may allow the guard 300 to move with the tilt lever 114, while the second tubular portion 304 may rotate around the second mounting stud 206, in the tilting arrangement 110.

As illustrated in FIGS. 3-4, the first tubular portion 302 and the longitudinal portion 306 may protrude from the adapter portion 308, in the guard 300. The longitudinal portion 306 may be protrude in a manner, such that a gap 310 is defined between the sensor assembly 200 and the tilting arrangement 110. In an embodiment, the longitudinal portion 306 may be a U-shaped member, seated to provide a close fit between the guard 300 and the tilting arrangement 110.

Further, the first tubular portion 302 provides a first cavity 312 to partially enclose the first mounting stud 204 of the sensor apparatus 202. Similarly, the second tubular portion 304 provides a second cavity 314 to partially enclose the second mounting stud 206 of the sensor apparatus 202. Also, the longitudinal portion 306 provides a recess 316 to partially enclose the lever member 208 of the sensor apparatus 202. The first cavity 312 and the second cavity 314 may also be adapted to partially enclose the slider fork section 210 and the clamp section 212 of the lever member 208, respectively.

In an embodiment, the guard 300 of the present disclosure may include a mounting ring 318 rigidly fixed to the bracket 216 in the sensor assembly 200. The mounting ring 318 may be disposed in the second cavity 314, between the second tubular portion 304 and the second mounting stud 206 of the sensor apparatus 202. Specifically, the mounting ring 318 may be disposed around the second mounting stud 206, and in close proximity to internal walls of the second tubular portion 304.

INDUSTRIAL APPLICABILITY

The industrial applicability of the system described herein will be readily appreciated from the foregoing discussion. The disclosed system provides the tilting arrangement 110 configured to provide the tilt movement to the implement 102. It is desired that the tilt angle of the implement 102 may be determined at any given time to control the machine operation. The machine 100 utilizes the sensor apparatus 202 for determining the tile angle of the implement 102. The sensor apparatus 202, using the sensor probe 214, may determine the movement of the lever member 208 moving corresponding to the tilt lever 114, which in turn provides the tilt movement to the implement 102. The movement of the lever member 208 may be used to determine the tilt angle of the implement 102 by the rotational angle detecting device.

Figure 5:
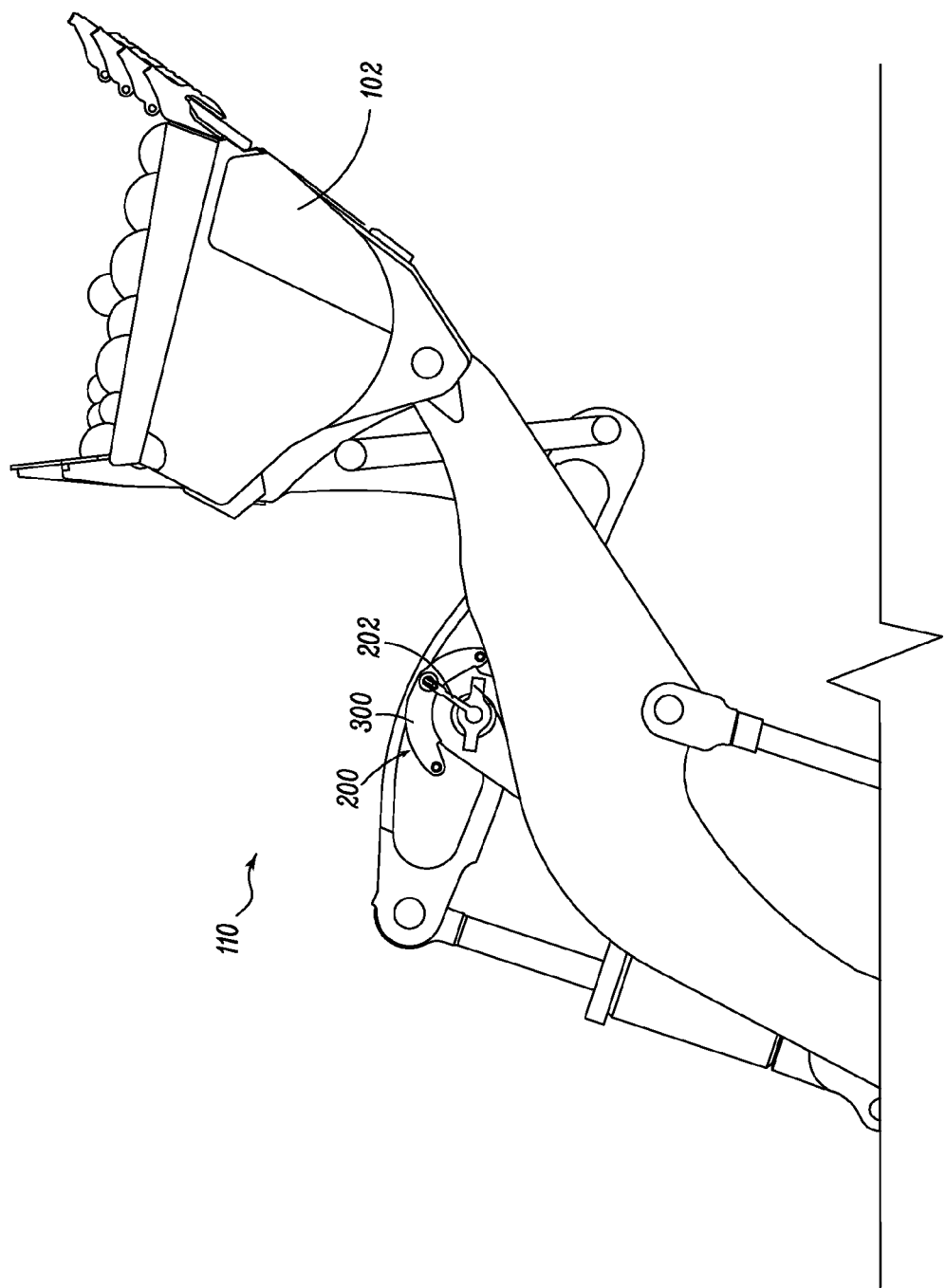
FIG. 5 illustrates a side view of the tilting arrangement, according to another aspect of the present disclosure.

Generally, the machines, like the machine 100 of the present disclosure, are required to perform earth-moving operations which pose a risk of debris falling into the sensor apparatus 202. FIG. 5 illustrates the tilting arrangement 110 in one of a possible position, when the risk of debris falling over the surrounding area of the sensor apparatus 202 is substantially high. The falling debris may damage the sensor apparatus 202, and/or affect the operation by clogging or altering the calibration of the sensor apparatus 202.

Typically, a guard is provided to protect the sensor apparatus in the machine against the falling debris. Conventional guards employed for protecting the sensor apparatus are either fender type that covers the entire region above the sensor apparatus, along with the region being defined by the rotational range of motion, or alternatively enclosure type that fully covers the sensor apparatus. Such guards may adequately protect the sensor apparatus in the machine, but are large sized and therefore lead to higher manufacturing costs.

Adding to this, such guards have larger shelf area and therefore less effective deflection characteristics which may lead to falling debris being accumulated over time and hinder the operation of the sensor apparatus. Further, these types of guards do not isolate the sensor apparatus from the relative motion between the tilt lever support and the lever member. Consequently, the guard may not be able to protect the sensor from damage due to debris that may get contained between the guard and the tilt lever support.

The sensor assembly 200 of the present disclosure provides the guard 300 for the sensor apparatus 202. The guard 300 conforms to the shape of the sensor apparatus 202, and thus limits the size of the guard 300 and therefore the sensor assembly 200. The reduced size may adds less weight to the sensor assembly 200, while simultaneously allowing the sensor assembly 200 to be used with the tilting arrangement 110 having space constraints. Also, the guard 300 may be required to use less material and therefore have a significantly lower manufacturing cost.

Further, the guard 300 of the present disclosure has substantially improved deflection characteristics because of the circular profile of the first and the second tubular portions 302, 304. This helps to reduce the accumulation of the falling debris over the guard 300, as the debris may slide-off the guard 300. Because of the close fit of the guard 300 with the tilting arrangement 110, the risk of the debris being wedged is reduced, and therefore avoids any hindrance to the relative movement between the tilt lever support 118 and the tilt lever 114. The gap 310, defined between the tilting arrangement 110 and the sensor assembly 200, may aid in the falling debris to pass away of the sensor apparatus 202, when the sensor assembly 200 is tilted.

The guard 300 of the present disclosure is further adapted to be easily installed or removed in the sensor assembly 200, because of the adapter portion 308 being removably connected to the tilt lever 114. This helps for easy maintenance and/or changing calibration of the sensor apparatus 202 in the sensor assembly 200, if required. The second tubular portion 304 is freely rotatable about the second mounting stud 206, relative to the movement of the tilt lever 114, because of the cantilevered support. Further, the mounting ring 318 is provided to protect the second mounting stud 206, in case of the second tubular portion 304 displacing and striking the second mounting stud 206 under a lateral impact to the guard 300.

Although the embodiments of this disclosure as described herein may be incorporated without departing from the scope of the following claims, it will be apparent to a person skilled in the art that various modifications and variations can be made. Other embodiments will be apparent to those skilled in the art from consideration of the specification and practice of the disclosure. It is intended that the specification and examples be considered as exemplary only, with a true scope being indicated by the following claims and their equivalents.

What is claimed is:

1. A sensor assembly for a tilting arrangement, the sensor assembly comprising:
    a sensor apparatus including:
        a first mounting stud supported on a tilt lever of the tilting arrangement,
        a second mounting stud supported on a tilt lever support of the tilting arrangement, and
        a lever member connected between the first mounting stud and the second mounting stud; and
    a guard for the sensor apparatus, the guard including:
        a first tubular portion supported on the tilt lever of the tilting arrangement, the first tubular portion providing a first cavity to partially enclose the first mounting stud of the sensor apparatus,
        a longitudinal portion extending from the first tubular portion, the longitudinal portion providing a recess to partially enclose the lever member of the sensor apparatus, and
        a second tubular portion extending from the longitudinal portion, the second tubular portion providing a second cavity to partially enclose the second mounting stud of the sensor apparatus.

2. The sensor assembly of claim 1, wherein the first cavity and the second cavity are partially enclosing a slider fork section and a clamp section of the lever member, respectively.

3. The sensor assembly of claim 1 further including a bracket removably mounted on the tilt lever support of the tilting arrangement, wherein the bracket supports the second mounting stud of the sensor apparatus.

4. The sensor assembly of claim 3, wherein the guard further includes a mounting ring fixed to the bracket.

5. The sensor assembly of claim 4, wherein the mounting ring is positioned between the second tubular portion and the second mounting stud of the sensor apparatus.

6. The sensor assembly of claim 1, wherein the guard further includes an adapter portion removably mounted on the tilt lever of the tilting arrangement.

7. The sensor assembly of claim 6, wherein the adapter portion is configured to provide a cantilever support for the guard on the tilt lever of the tilting arrangement.

8. The sensor assembly of claim 6, wherein the longitudinal portion protrudes from the adapter portion, and defines a gap between the sensor assembly and the tilting arrangement.

* * * * *